US010609942B2

(12) United States Patent
Chaturvedula et al.

(10) Patent No.: US 10,609,942 B2
(45) Date of Patent: Apr. 7, 2020

(54) COMPOSITIONS AND METHODS FOR SWEETENERS

(71) Applicant: JAMES AND CAROL MAY FAMILY, LLLP, Mesa, AZ (US)

(72) Inventors: Venkata Sai Prakash Chaturvedula, Tempe, AZ (US); Michael Perry May, Queen Creek, AZ (US); James A. May, Mesa, AZ (US)

(73) Assignee: James and Carol May Family, LLLP, Mesa, AZ (US)

( * ) Notice: Subject to any disclaimer, the term of this patent is extended or adjusted under 35 U.S.C. 154(b) by 0 days.

(21) Appl. No.: 14/989,705

(22) Filed: Jan. 6, 2016

(65) Prior Publication Data

US 2016/0192684 A1 Jul. 7, 2016

Related U.S. Application Data

(63) Continuation-in-part of application No. 14/628,085, filed on Feb. 20, 2015.

(60) Provisional application No. 62/100,374, filed on Jan. 6, 2015.

(51) Int. Cl.
*A23L 27/30* (2016.01)
*A23L 27/00* (2016.01)

(52) U.S. Cl.
CPC ............... *A23L 27/36* (2016.08); *A23L 27/88* (2016.08)

(58) Field of Classification Search
CPC .................................. A23L 27/36; A23L 27/88
USPC .................................................. 426/548, 615
See application file for complete search history.

(56) References Cited

U.S. PATENT DOCUMENTS

| | | |
|---|---|---|
| 2007/0082106 A1 | 4/2007 | Lee et al. |
| 2008/0226788 A1 | 9/2008 | Chang et al. |
| 2010/0267847 A1 † | 10/2010 | Yoshinaka |
| 2011/0052755 A1 † | 3/2011 | Fiorenza |
| 2012/0183648 A1 | 7/2012 | Sun et al. |
| 2012/0189739 A1 | 7/2012 | Rathke et al. |
| 2012/0264831 A1 † | 10/2012 | Bridges |
| 2013/0136838 A1 † | 5/2013 | San Miguel |
| 2014/0037814 A1 | 2/2014 | Quinlan et al. |
| 2014/0199246 A1 | 7/2014 | Purkayastha et al. |
| 2014/0342043 A1 | 11/2014 | Bell et al. |
| 2014/0370149 A1 | 12/2014 | Dewis et al. |

OTHER PUBLICATIONS

82nd JECFA Chemical and Technical Assessment, 2016 "Steviol Glycosides", Food and Agriculture Organization of the United Nations (FAO) 2016).

† cited by third party

*Primary Examiner* — Leslie A Wong
(74) *Attorney, Agent, or Firm* — The Noblitt Group, PLLC

(57) ABSTRACT

Various embodiments of the present technology provide compositions and methods for a sweetener composition comprising *stevia* leaf extract, *stevia* glycosides, and/or Luo Han Guo fruit extract. The sweetener composition provides enhanced taste and/or flavor properties as compared to other non-caloric or low-caloric sweeteners. The sweetener composition has a reduced aftertaste relative to *stevia* leaf extract and/or purified steviol glycoside. The sweetener composition may be formulated into any edible sweetened substances.

4 Claims, 1 Drawing Sheet

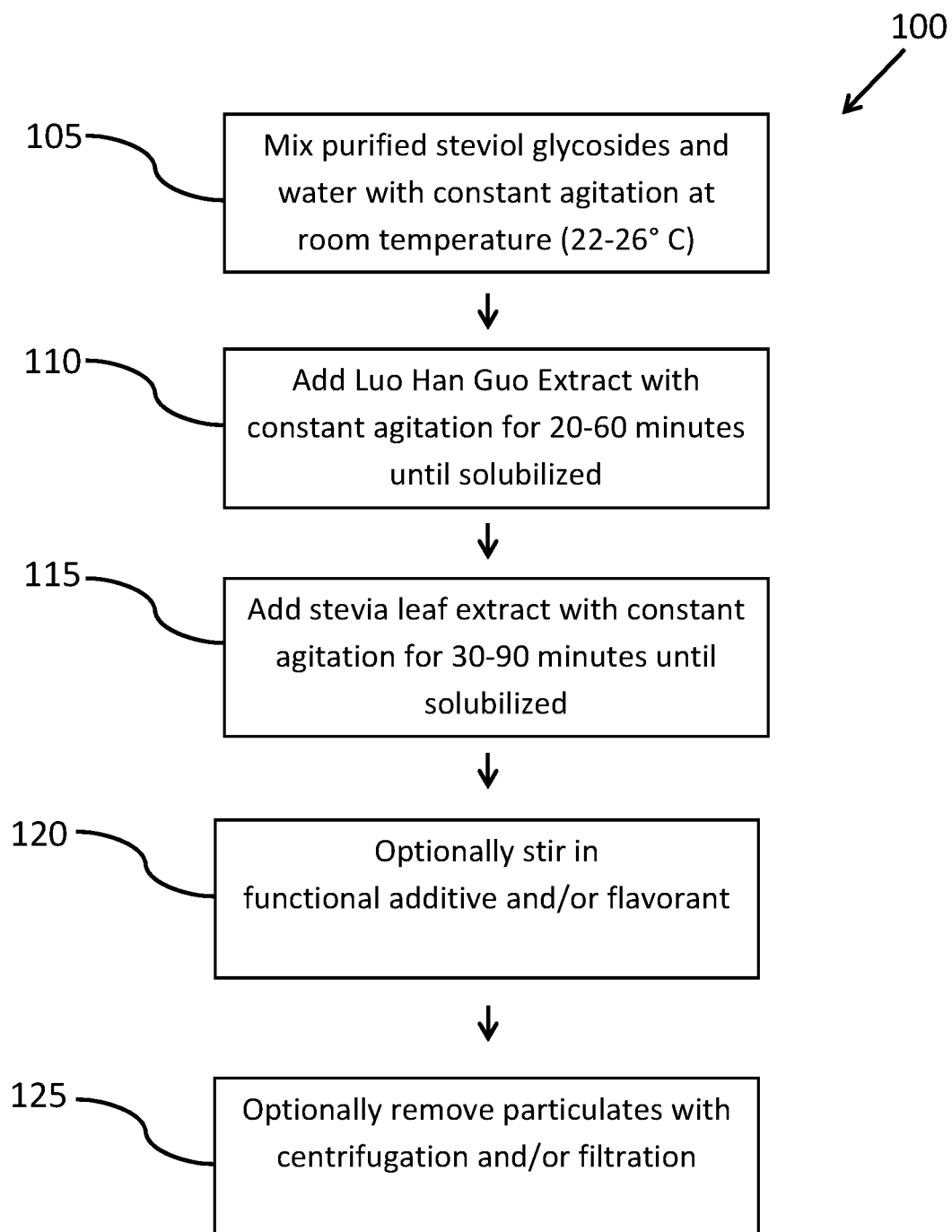

COMPOSITIONS AND METHODS FOR SWEETENERS

CROSS-REFERENCES TO RELATED APPLICATION

This application is a continuation-in-part and claims the benefit of U.S. Nonprovisional patent application Ser. No. 14/628,085, filed Feb. 20, 2015, and this application claims the benefit of U.S. Provisional Patent Application No. 62/100,374, filed Jan. 6, 2015, and incorporates the disclosure of this application in its entirety by reference. To the extent that the present disclosure conflicts with any referenced application, however, the present disclosure is to be given priority.

BACKGROUND OF THE TECHNOLOGY

Food and drink sweeteners are a pervasive part of the human diet due to their pleasing taste. Sweeteners may be natural or artificial, caloric or non-caloric, and may take any form suitable for use in edible materials, including granular, powder, syrup, and liquid. Sweeteners may be derived from a variety of sources. Caloric sweeteners include common table sugars (sucrose) derived from sugar-cane or sugar-beets. Other conventional caloric sugars, like fructose and palm sugar, are derived from fruit. Sugars add a pleasant taste to many foods but are high in calories, with one cup of table sugar exceeding 750 dietary calories. Consumption of conventional caloric sweeteners may have undesired effects, such as contributing to obesity and tooth decay. Consequently, various classes of non-caloric or low caloric sweeteners, or sugar substitutes, have been developed to replace sugars in food and drinks.

Sweeteners that may be used in lieu of sugar may be derived from natural sources or may be artificially produced through synthesis and/or derivation methods. Sugar substitutes may have several overall health benefits. Artificial and natural sugar substitutes overall have very few, if any, calories. This feature benefits consumers by lowering the amount of calories that are consumed, making weight management easier. Sugar substitutes generally also have a low glycemic index compared to sugar, resulting in a minimal impact on blood sugar levels. The glycemic index is a measure of how quickly a food raises blood sugar. Foods with a high glycemic index introduce sugar into the blood quickly, with a subsequent sharp reduction in blood sugar due to the action of the hormone insulin. This blood chemistry may create fatigue, dizziness, difficulty with concentration, and carbohydrate cravings leading to the desire to consume more high sugar foods. Foods with a low glycemic index are desirable by people with active lifestyles such as athletes or by people with metabolic disorders such as diabetes mellitus, hypoglycemia, or people suffering from obesity.

Sugar substitutes may also have numerous disadvantages. Some sugar substitutes have unpleasant tastes and/or consistencies. Other sweeteners may pose alleged health risks such as the development of brain tumors from excessive use of the artificial sweetener aspartame. Another drawback with conventional sugar substitutes is the difficulty in cooking with them. Specifically, because sugar substitutes are generally many times sweeter than sugar, less sweetener is required than conventional sugar, and thus it becomes difficult to follow most recipes calling for sugar.

BRIEF DESCRIPTION OF THE DRAWING

A more complete understanding of the present technology may be derived by referring to the detailed description when considered in connection with the following illustrative FIGURE. In the following FIGURE. FIG. 1 is a flow chart representatively illustrating an exemplary method of making the sweetener composition according to various aspects of the present technology.

BRIEF SUMMARY

Various embodiments provide a sweetener composition for use in sweetening ingestible substances, and methods for their manufacture. In various exemplary embodiments, the sweetener composition may comprise a *stevia* leaf extract, at least one steviol glycoside, and/or a Luo Han Guo fruit extract. The sweetener composition may have a reduced aftertaste relative to *stevia* leaf extract and/or purified steviol glycoside. In some embodiments, the composition may be combined with any suitable foods and/or beverages.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various process steps, compositions, formulations, etc. In addition, the present technology may be practiced in conjunction with any number of artificial and/or natural sweeteners, fillers, additives such as thickeners, and the system described is merely one exemplary application for the technology. Further, the present technology may employ any number of techniques for providing sweetener compositions that may have a modified and/or enhanced taste profile, increased stability at various temperatures and/or pH, a lower and/or zero-caloric index, and/or zero-glycemic index or lower glycemic index compared to high caloric sugars such as glucose, sucrose, fructose, and/or the like.

Formulations and methods for producing a composition according to various aspects of the present technology may provide a sweetener composition. The sweetener composition may have an enhanced taste profile with a natural sweetness similar to the caloric sugars. For example, the sweetener composition may have a pleasant mouth-feel, reduced bitterness and/or reduced aftertaste compared to other sugar substitutes, a pleasant fresh aroma and other desired organoleptic properties.

In one embodiment, the formulations and methods may include any suitable combination of natural sweeteners and/or artificial sweeteners. In another embodiment, the formulations and methods may include one or more natural sweeteners comprising a *stevia* extract and/or a *stevia* glycoside. In yet another embodiment, the formulations and methods may include a combination of natural sweeteners, flavor ingredients (flavorants), and/or functional additives. In some embodiments, the sweetener composition may include additives for modifying viscosity, pH, and/or any other physical property to optimize combining the sweetener composition with foods and/or beverages.

In some embodiments, the sweetener composition may comprise only natural components. In various embodiments, the sweetener composition may be entirely natural in origin. In one embodiment, the natural origin may mean that the ingredients are extracted directly from plants, animals, and/or microbial sources, not produced synthetically or biochemically or enzymatically, and/or not contain synthetic ingredients. In another embodiment, the natural origin may mean that the components of the sweetener composition may be extracted from plants, animals, and/or microbial sources and does not undergo a synthetic or bio-chemical or enzymatic process that chemically changes the components. In another embodiment, the natural origin may mean that the components of the sweetener composition may be present in and/or produced by nature and extracted or processed using natural ingredients as solvents such as water. In some embodiments, the sweetener composition may comprise one or more natural components that are certified as organic under the authority of the U.S. Department of Agriculture's Organic Rule.

Various embodiments of the sweetener composition of the present technology may comprise a combination of *stevia* leaf extract, at least one steviol glycoside, and/or a Luo Han Guo fruit extract. The *stevia* leaf extract may be produced from leaves of plants of the sunflower family Asteraceae such as the species *Stevia rebaudiana*, which may be referred to as "*stevia*." The steviol glycoside may comprise one or more substantially pure steviol glycosides purified from *stevia* leaves. The Luo Han Guo fruit extract may comprise any extract of the herbaceous perennial vine of the Cucurbitaceae family such as *Siraitia grosvenorii* (common name "Luo Han Guo" or "monk fruit").

In various embodiments, the sweetener composition may have a reduced aftertaste and/or an enhanced sweet taste relative to the combination of *stevia* leaf extract and purified steviol glycoside and the combination of Luo Han Guo fruit extract with either *stevia* leaf extract or purified steviol glycosides. The sweetener composition may also have a reduced aftertaste and/or an enhanced sweet taste relative to each of *stevia* leaf extract alone and purified steviol glycoside alone. The aftertaste of *stevia* leaf extracts and/or purified steviol glycosides may be unpleasant due to the tendency of the aftertaste to linger. Accordingly, the sweetener composition comprising the combination of *stevia* leaf extract, at least one steviol glycoside, and Luo Han Guo fruit extract may synergistically enhance the flavor relative to its components such that aftertaste is reduced or eliminated. In some embodiments, the flavor of the sweetener composition may also be enhanced relative to its components such that bitter taste is reduced or eliminated and/or the sweet taste is enhanced to be clean, appealing, and/or even tasting.

The *stevia* leaf extract, in accordance with various exemplary embodiments, may be a crude and/or an at least partially refined preparation from *stevia* plant leaves. The *stevia* leaf extract may contain any one or more of the approximately 40 *stevia* glycosides typically contained in the *stevia* leaves. The *stevia* leaf extract may be prepared by any conventional preparation methods, such as boiling the *stevia* leaves in water and/or organic ethanol extraction processes and crystallization.

In some embodiments, the *stevia* leaf may be ground, pulverized, shredded, dried, or otherwise processed. Some extraction methodologies may comprise solvent extraction with one or more polar solvents, non-polar solvents, water, ethanol, chloroform, ethyl acetate, methanol, and the like. In some embodiments, the *stevia* leaf extract may be concentrated and/or purified by any suitable method to produce a *stevia* leaf extract having a desired *stevia* glycoside profile. In some embodiments, the *stevia* leaf extract may comprise any suitable derivative of the plant extract, such as a product of hydrolysis of the plant extract.

Various crops of *stevia* leaves used to produce the *stevia* leaf extract may contain varying quantities of *stevia* glycosides. In addition to *stevia* glycosides, the *stevia* leaf extract may also comprise other biological components contributing to the taste profile or other desired properties of the sweetener composition, such as any one or more of sesquiterpenes, alcohols, labdanic diterpenes, aliphatic hydro-carbons, sterols, poly phenols, and triterpenes. In one embodiment, the *stevia* leaves may be selected for having a desired *stevia* glycoside profile. For example, the *stevia* leaves may contain approximately 50-80% by weight of the steviol glycoside Rebaudioside A. In some embodiments, the *stevia* leaves may contain approximately 60-72% by weight of Rebaudioside A.

In various embodiments of the present technology, the sweetener composition may comprise one or more substantially pure steviol glycosides purified from *stevia* leaves. The substantially pure steviol glycoside may contain any one or more of the approximately 40 steviol glycosides typically contained in the *stevia* leaves. In some embodiments, a *stevia* leaf extract produced by the method outlined above may be concentrated and purified using any conventional methods to obtain the least one substantially pure steviol glycoside. In some embodiments, the substantially pure steviol glycoside may be purchased from any suitable commercial manufacturer in any suitable form or mixture of steviol glycosides. In various embodiments, the substantially pure steviol glycosides may be ≥95% pure.

In various embodiments, the substantially pure steviol glycoside may comprise substantially pure steviol glycosides having desired properties such as a sweetness potency or absence of a displeasing aftertaste. In one embodiment, the substantially pure steviol glycoside may be selected for having a desired steviol glycoside profile. The various *stevia* glycosides may comprise one or more of: Rebaudioside A, rebaudioside B, rebaudioside C, rebaudioside D, rebaudioside E, rebaudioside F, rebaudioside G, rebaudioside H, rebaudioside I, rebaudioside J, rebaudioside K, rebaudioside L, rebaudioside M, rebaudioside N, rebaudioside O, and dulcoside A, stevioside, and rubusoside.

In accordance with various exemplary embodiments of the present technology, the sweetener composition may comprise Luo Han Guo fruit extract (also referred to as monk fruit). Luo Han Guo refers to the fruit of the plant *Sirailia grosvenori*. The Luo Han Guo fruit extract may be a crude and/or an at least partially refined preparation from the Luo Han Guo fruit. Luo Han Guo fruit may comprise triterpene glycosides called mogrosides I through mogroside VI. In one embodiment, the Luo Han Guo fruit extract may be selected for having a desired concentration of mongroside V. For example, in some embodiments, the Lou Han Guo fruit extract may contain approximately 20-60% by weight of mogroside V. In some exemplary embodiments, the Luo Han Guo fruit extract may contain approximately 35-50% by weight of mogroside V.

In various embodiments, the sweetener composition may comprise additional natural sweeteners. For example, the additional natural sweeteners may comprise one or more of: rebaudioside C, rebaudioside E, rebaudioside F, rebaudioside G, rebaudioside I, rebaudioside H, rebaudioside J, rebaudioside K, rebaudioside L, rebaudioside N, rebaudioside O, dulcoside A, mogroside VI, iso-mogroside V, siamenoside, mogroside IV, abrusoside A, pterocaryoside A, pterocaryoside B, curculin, glycyrrhizic acid and its salts, thaumatin, monellin, mabinlin, brazzein, hernandulcin, phyllodulcin, glycyphyllin, phloridzin, trilobatin, baiyunoside, osladin, polypodoside A, mukurozioside, phlomisoside I, periandrin I, and cyclocarioside I, and/or a combination thereof.

In some embodiments of the present technology, the sweetener composition may further comprise artificial sweeteners. The artificial sweetener may comprise any sweetener which is not found in nature, such as: sucralose, acesulfame acid and salts thereof, aspartame, alitame, saccharin and salts thereof, cyclamate, cyclamic acid and salts thereof, neotame, advantame, neohesperidin dihydrochalcone (NHDC), glycosylated steviol glycosides (GSGs), and glycosylated mogrosides, and/or a combination thereof.

In some embodiments, the sweetener composition may further comprise an oligosaccharide. For example, the oligosaccharide may comprise a polymer of monosaccharides such as: glyceraldehyde, dihydroxyacetone, erythrose, threose, erythrulose, arabinose, lyxose, mannoheptulose, sedoheltulose, ribose, xylulose, galactose, glucose, gulose, idose, mannose, talose, fructose, psicose, allose, altrose, sorbose, tagatose, octolose, fucose, xylose, ribulose, rhamnose, arabinose, turanose, and sialos, and/or a combination thereof.

In various embodiments, the sweetener composition may further comprise a filler material to provide volume to the sweetener composition. The filler material may comprise a polyol (sugar alcohol) which may be any suitable sugar alcohol, polyhydric alcohol, and/or polyalcohol. In some embodiments, the polyol may comprise at least one of: erythritol, maltitol, mannitol, sorbitol, lactitol, xylitol, inositol, isomalt, hydrogenated isomaltulose, reduced isomaltooligosaccharides, propylene glycol, glycerol, threitol, galactitol, reduced xylo-oligosaccharides, and reduced gentiooligosaccharides, and/or a combination thereof.

In various embodiments, the sweetener composition may further comprise a flavorant. Exemplary flavorants may comprise any suitable liquid ingredient that provides a flavor to food and beverages such as herbal and/or spice extracts and/or their essences. In some embodiments, the flavorant may comprise liquid components of fruits, vegetables, nuts such as vanilla extract, grape seed extract, hazelnut, and the like. In various embodiments, the flavorants may comprise approximately 5%-25% by weight of the sweetener composition. Exemplary flavorants may exhibit a specific gravity of approximately 0.82-1.2. Exemplary flavorants may exhibit a refractive index of approximately 1.30-1.468.

In various embodiments, the sweetener composition may further comprise a functional additive. The functional additive may be any compound added to the sweetener composition for a functional or aesthetic purpose. For example, the functional additive may be at least one of: a potentiate, a dye, a nutritional supplement such as a vitamin, and pharmaceutical.

The sweetener composition, according to the present technology, may be mixed, formulated, or otherwise prepared in any suitable manner for use as a sweetener. For example, in one embodiment, the composition may comprise a fine or granulated powder. In another embodiment, the composition may comprise a liquid at various temperatures. In yet another embodiment, the composition may comprise a viscosity liquid having such that the formulation has the consistency of syrup or gel. In yet another embodiment, the sweetener composition may comprise a solid or semisolid paste at various temperatures.

In some embodiments, the sweetener composition according to the present technology may be added to foods or beverages for sweetening. In one embodiment, the composition may have a minimal impact on blood sugar. In another embodiment, the sweetener composition may provide a low-caloric or non-caloric alternative to traditional sugar substitutes that has a minimal impact on blood sugar levels. For example, the sweetener composition may be formulated as a chocolate or English toffee flavoring for foods or beverages such as coffee or ice cream.

Exemplary Methods for Formulating the Sweetener Composition

Referring to FIG. 1, in an exemplary embodiment of a method for making the sweetener composition 100, purified steviol glycosides may be mixed with water to the desired concentration with substantially constant agitation at room temperature (approximately 22° C.-26° C.) (105). Agitation may comprise the use of any suitable agitation system such as a stir bar and magnetic stir plate, a shaker tables, mechanical mixers and the like. Luo Han Guo fruit extract may then be added with substantially constant agitation for approximately 20-60 minutes until the mixture is at least partially to completely solubilized (110). Stevia leaf extract may then be added to the mixture with substantially constant agitation for approximately 30-90 minutes until the mixture is at least partially to completely solubilized to produce the sweetener composition (115). Solubilization may be considered to occur when the mixture is visibly clear by inspection. In some embodiments, functional additives and/or flavorants may be added to the sweetener composition (120). In some embodiments, any particulates in the sweetener composition may be removed by any suitable method such as conventional filtration (such as with membrane filtration or sieving through cellulose filter paper) and/or centrifugation to produce a clear liquid (125).

As discussed above, the sweetener composition according to the present technology may comprise a mixture of stevia leaf extract, steviol glycosides, and/or Lou Han Guo fruit extracts. In various embodiments, each of the ingredients of the mixture may constitute any suitable portion of the composition to achieve a desired sweet taste, absence of aftertaste, mouth-feel, and the like. For example, in one embodiment, the sweetener composition may comprise approximately 45-84% by weight of stevia leaf extract, approximately 8-42% by weight of substantially pure steviol glycosides, and/or approximately 6-32% by weight of Luo Han Guo fruit extract.

In some embodiments, the sweetener composition may comprise the stevia leaf extract having about 95% by weight of a mixture of total stevia glycosides (designated SG95), wherein the mixture contains about 50%-80% by weight Rebaudioside-A. The sweetener composition may further comprise at least one purified steviol glycoside with purity ≥95%, wherein the purified steviol glycoside comprises at least one of: rebaudioside A, stevioside, rebaudioside D, rebaudioside M, rebaudioside B, rebaudioside C, rebaudioside E, rebaudioside F, rebaudioside G, rebaudioside I, rebaudioside H, rebaudioside J, rebaudioside K, rebaudioside L, rebaudioside N, rebaudioside O, rubusoside, steviolbioside, dulcoside A, and combinations thereof. The sweetener composition may further comprise Luo Han Guo fruit extract comprising approximately 20-60% by weight mogroside V.

Various exemplary embodiments of the sweetener composition may comprise stevia leaf extract containing greater than about 50% by weight, greater than about 60% by weight, greater than about 70% by weight, greater than about 80% by weight, or greater than about 90% by weight Rebaudioside A. In some embodiments, the at least one purified steviol glycoside may comprise 95%-99% by weight Rebaudioside A, greater than about 95% by weight Rebaudioside A, greater than about 97% by weight Rebaudioside A, and/or greater than about 99% by weight Rebaudioside A. In some embodiments, the at least one purified steviol glycoside may comprise greater than about 95% by weight Stevioside, greater than about 95% by weight Rebaudioside D, greater than about 95% by weight Rebaudioside M, greater than about 95% by weight Rebaudioside E, greater than about 95% by weight Rubusoside, and/or greater than about 95% by weight Rebaudioside D and Rebaudioside M mixture (1:1 to 98:2). In some embodiments, the Luo Han Guo fruit extract may comprise about 20-60% by weight of mogroside V, such as 30% mogroside V, 40% mogroside V, 50% mogroside V, and 60% mogroside V.

Variations on the exemplary method of making the sweetener composition illustrated in FIG. 1 are provided below. The variations of the method below pertain to the content of the Rebaudioside A in the *stevia* leaf extract, type of *stevia* glycosides, and the content of mogroside V in the Luo Han Guo fruit extract that is used in each sweetener composition. Generally, the sweetener composition may comprise approximately 45-84% by weight of *stevia* leaf extract, approximately 8-42% of at least one purified steviol glycoside with purity of ≥95%, and/or approximately 6-32% by weight of Luo Han Guo fruit extract. Further, various embodiments of the sweetener composition may comprise *stevia* leaf extract containing ≥95% stevol glycoside mixture of which approximately 50-80% by weight is Rebaudioside A; purified steviol glycosides which may comprise rebaudioside A, rebaudioside B, rebaudioside C, rebaudioside D, rebaudioside E, rebaudioside F, rebaudioside G, rebaudioside I, rebaudioside H, rebaudioside J, rebaudioside K, rebaudioside L, rebaudioside M, rebaudioside N, rebaudioside O, dulcoside A or a combination of two or more purified compounds; and Luo Han Guo fruit extract comprising approximately 20-60% is mogroside V.

EXAMPLES

The present technology may be further illustrated by the following examples, which are not to be construed in any way as limiting the scope thereof. The present technology may be formulated in various other embodiments, modifications, and equivalents thereof without departing from the spirit of the present technology and/or the scope of the appended claims.

Example 1

*Stevia* leaf extract (SG95RA50), Rebaudioside A (≥95-99%), and Luo Han Guo fruit extract (Mog V-40%):

Purified Rebaudioside A (≥95%) is mixed with Luo Han Guo fruit extract (mogroside V 40%) and blended for 30 minutes. This mixture is blended with *stevia* leaf extract SG95RA50 (*Stevia* Glycosides 95% with Rebaudioside-A 50%) for 45 minutes. In various embodiments, the weight ratio of SG95RA50, purified Rebaudioside-A (95%), and Luo Han Guo fruit extract may be about 86:8:6 to 68:20:12. For example, the weight ratio of SG95RA50, purified Reb-A (95%) and Luo Han Guo fruit extract may be about 78:12:10.

Example 2

*Stevia* leaf extract (SG95RA60), Rebaudioside A (≥95-99%), and Luo Han Guo fruit extract (Mog V-40%):

Purified Rebaudioside A (95%) is mixed with Luo Han Guo fruit extract (mogroside V 40%) and blended for 30 minutes. This mixture is blended with *stevia* leaf extract SG95RA60 (*Stevia* Glycosides 95% with Rebaudioside-A 60%) for 45 minutes. In various embodiments, the weight ratio of SG95RA60, Rebaudioside-A (95%) and Luo Han Guo fruit extract may be about 74:8:18 to 70:18:12. For example, the weight ratio of SG95RA60, purified Rebaudioside-A (95%) and Luo Han Guo fruit extract may be about 72:10:18.

Example 3

*Stevia* leaf extract (SG95RA70), Rebaudioside A (≥95-99%), and Luo Han Guo fruit extract (Mog V-40%):

Purified Rebaudioside A (95%) is mixed with Luo Han Guo fruit extract (mogroside V 40%) and blended for 30 minutes. This mixture is blended with *stevia* leaf extract SG95RA70 (*Stevia* Glycosides 95% with Rebaudioside-A 70%) for 45 minutes. In various embodiments, the weight ratio of SG95RA70, purified Rebaudioside-A (95%) and Luo Han Guo fruit extract may be about 70:18:12 to 62:20:18. For example, the weight ratio of SG95RA70, purified Rebaudioside-A (95%), and Luo Han Guo fruit extract may be about 68:12:18.

Example 4

*Stevia* leaf extract (SG95RA80), Rebaudioside A (≥95-99%), and Luo Han Guo fruit extract (Mog V-40%):

Purified Rebaudioside A (95%) is mixed with Luo Han Guo fruit extract (mogroside V 40%) and blended for 45 minutes. This mixture is blended with *stevia* leaf extract SG95RA80 (*Stevia* Glycosides 95% with Rebaudioside-A 80%) for 45 minutes. In various embodiments, the weight ratio of SG95RA80, purified Rebaudioside-A (95%) and Luo Han Guo fruit extract may be about 78:12:10 to 76:26:18. For example, the weight ratio of SG95RA80, purified Reb-A (95%) and Luo Han Guo fruit extract may be about 76:14:8.

Example 5

*Stevia* leaf extract (SG95RA50 to SG95RA80), Rebaudioside A (≥95-99%), and Luo Han Guo fruit extract (Mog V-50%):

Purified Rebaudioside A (95%) is mixed with Luo Han Guo fruit extract (mogroside V 50%) and blended for 30 minutes. This mixture is blended with *stevia* leaf extract SG95RA50 (*Stevia* Glycosides 95% with Rebaudioside-A 50%) for 45 minutes. In various embodiments, the weight ratio of SG95RA50, purified Rebaudioside-A (95%), and Luo Han Guo fruit extract may be about 82:12:6 to 62:26:12. For example, the weight ratio of SG95RA50, purified Rebaudioside-A (95%), and Luo Han Guo fruit extract may be about 78:14:8.

Example 6

*Stevia* leaf extract (SG95RA50 to SG95RA80), Stevioside (≥95%), and Luo Han Guo fruit extract (Mog V-40 and 50%):

Purified stevioside (≥95%) is mixed with Luo Han Guo fruit extract (mogroside V 40%) and blended for 30 minutes. This mixture is blended with *stevia* leaf extract SG95RA50 (*Stevia* Glycosides 95% with Rebaudioside-A 50%) for 45 minutes. In various embodiments, the weight ratio of SG95RA50, purified stevioside, and Luo Han Guo fruit extract may be about 78:8:14 to 68:20:8. For example, the weight ratio of SG95RA50, purified Rebaudioside-A (95%) and Luo Han Guo fruit extract may be about 76:14:10.

Example 7

Stevia leaf extract (SG95RA50 to SG95RA80), Rebaudioside D (≥95%), and Luo Han Guo fruit extract (Mog V-40 and 50%):

Purified Rebaudioside D (≥95%) is mixed with Luo Han Guo fruit extract (mogroside V 40%) and blended for 30 minutes. This mixture is blended with *stevia* leaf extract SG95RA50 (*Stevia* Glycosides 95% with Rebaudioside-A 50%) for 45 minutes. In various embodiments, the weight ratio of SG95RA50, purified Rebaudioside D, and Luo Han Guo fruit extract may be about 68:18:14 to 68:20:8. For example, the weight ratio of SG95RA50, purified Rebaudioside D, and Luo Han Guo fruit extract may be about 68:20:12.

Example 8

Stevia leaf extract (SG95RA50 to SG95RA80), Rebaudioside M (≥95%), and Luo Han Guo fruit extract (Mog V-40 and 50%):

Purified Rebaudioside M (≥95%) is mixed with Luo Han Guo fruit extract (mogroside V 40%) and blended for 30 minutes. This mixture is blended with *stevia* leaf extract SG95RA50 (*Stevia* Glycosides 95% with Rebaudioside-A 50%) for 45 minutes. In various embodiments, the weight ratio of SG95RA50, purified Rebaudioside M, and Luo Han Guo fruit extract may be about 74:18:8 to 82:10:8. For example, the weight ratio of SG95RA50, purified Rebaudioside M, and Luo Han Guo fruit extract may be about 78:14:8.

Example 9

Stevia leaf extract (SG95RA50 to SG95RA80), Rebaudioside E (≥95%), and Luo Han Guo fruit extract (Mog V-40 and 50%):

Purified Rebaudioside E (≥95%) is mixed with Luo Han Guo fruit extract (mogroside V 40%) and blended for 30 minutes. This mixture is blended with *stevia* leaf extract SG95RA50 (*Stevia* Glycosides 95% with Rebaudioside-A 50%) for 60 minutes. In various embodiments, the weight ratio of SG95RA50, purified Rebaudioside E, and Luo Han Guo fruit extract may be about 60:22:18 to 82:10:8. For example, the weight ratio of SG95RA50, purified Rebaudioside E, and Luo Han Guo fruit extract may be about 76:16:8.

Example 10

Stevia leaf extract (SG95RA50 to SG95RA80); Rebaudioside D (≥95%) and Rebaudioside M (≥95%) mixture; and Luo Han Guo fruit extract (Mog V-40 and 50%):

Purified Rebaudioside D (≥95%) and Rebaudioside M (≥95%) mixture (50:50) is mixed with Luo Han Guo fruit extract (mogroside V 40%) and blended for 30 minutes. This mixture is blended with *stevia* leaf extract SG95RA50 (*Stevia* Glycosides 95% with Rebaudioside-A 50%) for 45 minutes. In various embodiments, the weight ratio of SG95RA50, purified Rebaudioside D (≥95%) and Rebaudioside M (≥95%) mixture (50:50), and Luo Han Guo fruit extract may be about 82:10:8 to 66:24:10. For example, the weight ratio of SG95RA50, mixture of purified Rebaudioside D and Rebaudioside M, and Luo Han Guo fruit extract may be about 78:12:10.

Example 11

Stevia leaf extract (SG95RA60), Rubusoside (≥95%), and Luo Han Guo fruit extract (Mog V-20-60%):

Purified Rubusoside (≥95%) is mixed with Luo Han Guo fruit extract (mogroside V 20%) and blended for 45 minutes. This mixture is blended with *stevia* leaf extract SG95RA60 (*Stevia* Glycosides 95% with Rebaudioside-A 60%) for 60 minutes. In various embodiments, the weight ratio of SG95RA60, purified Rubusoside and Luo Han Guo fruit extract may be about 72:20:8 to 84:8:8. For example, the weight ratio of SG95RA60, purified Rubusoside, and Luo Han Guo fruit extract may be about 74:18:8.

The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail.

In the foregoing description, the technology has been described with reference to specific exemplary embodiments; however, it will be appreciated that various modifications and changes may be made without departing from the scope of the present technology as set forth herein. The description and figures are to be regarded in an illustrative manner, rather than a restrictive one and all such modifications are intended to be included within the scope of the present technology. Accordingly, the scope of the technology should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any system embodiment may be combined in a variety of permutations to produce substantially the same result as the present technology and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

We claim:

1. A method of making an aqueous sweetener composition comprising:
    mixing a steviol glycoside composition comprising at least 95% by weight of steviol glycosides with water at room temperature to create an aqueous mixture;
    mixing a Luo Han Guo fruit extract comprising 40% by weight Mogroside-V into the aqueous mixture at room temperature until a first solution comprising the aqueous mixture and the Luo Han Guo fruit extract is visibly clear by inspection; and mixing a *stevia* leaf extract into the first solution until a second solution comprising the first solution and the *stevia* leaf extract is visibly clear by inspection, wherein the second solution is the aqueous sweetener composition having a weight ratio of the *stevia* leaf extract, the steviol glycoside composition, and the Luo Han Guo fruit extract in a range from 86:8:6 to 62:20:18.

2. The method of claim 1, wherein a weight ratio of a mixture of steviol glycosides in the *stevia* leaf extract and in the steviol glycoside composition to the Mogroside-V is in a range from 97:3 to 88:12.

3. The method of claim 1, wherein the steviol glycoside composition comprises at least 95% by weight of Rebaudioside A.

4. The method of claim 3, wherein the *stevia* leaf extract comprises 50% by weight Rebaudioside A; and wherein the weight ratio of Rebaudioside A to Mogroside-V is in a range from 90:10 to 95:5.

* * * * *